(12) United States Patent
Kato et al.

(10) Patent No.: US 12,515,241 B2
(45) Date of Patent: Jan. 6, 2026

(54) METHOD OF ACTUATING ULTRASONIC DRIVE DEVICE, ULTRASONIC DRIVE DEVICE, AND ULTRASONIC TREATMENT SYSTEM

(71) Applicant: Olympus Corporation, Tokyo (JP)

(72) Inventors: Gen Kato, Hachioji (JP); Shunsuke Matsui, Hachioji (JP); Ko Kawashima, Tokyo (JP)

(73) Assignee: Olympus Corporation, Tokyo (JP)

( * ) Notice: Subject to any disclaimer, the term of this patent is extended or adjusted under 35 U.S.C. 154(b) by 327 days.

(21) Appl. No.: 18/167,535

(22) Filed: Feb. 10, 2023

(65) Prior Publication Data

US 2023/0182172 A1 Jun. 15, 2023

Related U.S. Application Data

(63) Continuation of application No. PCT/JP2020/032465, filed on Aug. 27, 2020.

(51) Int. Cl.
*B06B 1/06* (2006.01)
*A61B 17/00* (2006.01)
(Continued)

(52) U.S. Cl.
CPC ........ *B06B 1/06* (2013.01); *A61B 17/320092* (2013.01); *A61B 2017/00473* (2013.01);
(Continued)

(58) Field of Classification Search
CPC .......... B06B 1/06; A61B 2017/320094; A61B 2017/00473; A61B 2017/22018
See application file for complete search history.

(56) References Cited

U.S. PATENT DOCUMENTS 6,083,191 A 7/2000 Rose
9,017,326 B2 4/2015 Dinardo et al.
(Continued)

FOREIGN PATENT DOCUMENTS

JP 06339484 A 12/1994
JP 07500273 A 1/1995
(Continued)

OTHER PUBLICATIONS

Machine Translation of JP-2011067545-A (Year: 2011).*
(Continued)

*Primary Examiner* — Tan-Uyen T Ho
*Assistant Examiner* — Cherie M Poland
(74) *Attorney, Agent, or Firm* — Schwegman Lundberg & Woessner, P.A.

(57) ABSTRACT

A method of actuating an ultrasonic drive device includes sweeping, by a first control circuit, a frequency at which an ultrasonic transducer oscillates from a predetermined frequency toward a resonant frequency, predicting, by a prediction circuit, whether or not ringing occurs based on a first parameter representing a driving state of the ultrasonic transducer, and if the prediction circuit predicts that the ringing does not occur and if a second parameter representing a frequency at which the ultrasonic transducer is driven satisfies a predetermined condition, resonantly driving, by a second control circuit, the ultrasonic transducer at a resonant frequency by PLL control.

18 Claims, 9 Drawing Sheets

(51) Int. Cl.
*A61B 17/22* (2006.01)
*A61B 17/32* (2006.01)

(52) U.S. Cl.
CPC ............... *A61B 2017/22018* (2013.01); *A61B 2017/320094* (2017.08)

(56) References Cited

U.S. PATENT DOCUMENTS

| | | |
|---|---|---|
| 9,237,921 B2 | 1/2016 | Messerly et al. |
| 9,724,118 B2 | 8/2017 | Schulte et al. |
| 2002/0049462 A1 | 4/2002 | Friedman et al. |
| 2018/0311703 A1* | 11/2018 | Akagane ............... B06B 1/06 |
| 2019/0201047 A1* | 7/2019 | Yates ................ A61B 18/1445 |

FOREIGN PATENT DOCUMENTS

| | | | |
|---|---|---|---|
| JP | 2002282270 A | | 10/2002 |
| JP | 2005027907 A | | 2/2005 |
| JP | 2011067545 A | * | 4/2011 |
| WO | WO-2017119099 A1 | | 7/2017 |

OTHER PUBLICATIONS

"International Application Serial No. PCT/JP2020/032465, International Search Report dated Nov. 10, 2020", (Nov. 10, 2020), 2 pgs.

* cited by examiner

METHOD OF ACTUATING ULTRASONIC DRIVE DEVICE, ULTRASONIC DRIVE DEVICE, AND ULTRASONIC TREATMENT SYSTEM

CROSS-REFERENCE TO RELATED APPLICATION

This application is a continuation of International Application No. PCT/JP2020/032465, filed on Aug. 27, 2020, the entire contents of which are incorporated herein by reference.

BACKGROUND

1. Technical Field

The present disclosure relates to a method of actuating an ultrasonic drive device, an ultrasonic drive device, and an ultrasonic treatment system.

2. Related Art

In the related art, there has been known an ultrasonic treatment system in which an ultrasonic transducer oscillates in response to an output of an ultrasonic drive device to perform a treatment on a living tissue. In the ultrasonic treatment system, the ultrasonic drive device oscillates the ultrasonic transducer at a resonant frequency, whereby a large amplitude can be obtained.

In order to search for the resonant frequency, the ultrasonic drive device sweeps the frequency at which the ultrasonic transducer oscillates from a predetermined frequency toward the resonant frequency (e.g., see JP H6-339484 A). The ultrasonic drive device locks the frequency at which the ultrasonic transducer oscillates to the searched resonant frequency by phase locked loop (PLL) control.

SUMMARY

In some embodiments, a method of actuating an ultrasonic drive device includes sweeping, by a first control circuit, a frequency at which an ultrasonic transducer oscillates from a predetermined frequency toward a resonant frequency, predicting, by a prediction circuit, whether or not ringing occurs based on a first parameter representing a driving state of the ultrasonic transducer, and if the prediction circuit predicts that the ringing does not occur and if a second parameter representing a frequency at which the ultrasonic transducer is driven satisfies a predetermined condition, resonantly driving, by a second control circuit, the ultrasonic transducer at a resonant frequency by PLL control.

In some embodiments, an ultrasonic drive device includes: a first control circuit configured to sweep a frequency at which an ultrasonic transducer oscillates from a predetermined frequency toward a resonant frequency, a prediction circuit configured to predict whether or not ringing occurs based on a first parameter representing a driving state of the ultrasonic transducer, and a second control circuit configured to, if the prediction circuit predictes that the ringing does not occur and if a second parameter representing a frequency at which the ultrasonic transducer is driven satisfies a predetermined condition, resonantly drive the ultrasonic transducer at a resonant frequency by PLL control.

In some embodiments, an ultrasonic treatment system includes: the ultrasonic drive device; and an ultrasonic transducer configured to oscillate in response to an output of the ultrasonic drive device.

The above and other features, advantages and technical and industrial significance of this disclosure will be better understood by reading the following detailed description of presently preferred embodiments of the disclosure, when considered in connection with the accompanying drawings.

DETAILED DESCRIPTION

Embodiments of a method of actuating an ultrasonic drive device, an ultrasonic drive device, and an ultrasonic treatment system according to the disclosure will be described below with reference to the drawings. Note that the disclosure is not limited by these embodiments. In the following embodiments, the method of actuating an ultrasonic drive device, the ultrasonic drive device, and the ultrasonic treatment system for performing a treatment on a living tissue will be described as examples, but the disclosure can be generally applied to methods of actuating ultrasonic drive devices, ultrasonic drive devices, and ultrasonic treatment systems for resonantly driving ultrasonic transducers.

In the description of the drawings, the same or corresponding elements are denoted by the same reference numerals as appropriate. It is necessary to note that the drawings are schematic illustration in which the dimensional relationships of each element, and the proportions of each element, for example, may differ from the actual relationships and proportions. There may be differences in dimensional relationships and proportions between the drawings.

First Embodiment

Configuration of Ultrasonic Treatment System

Figure 1:
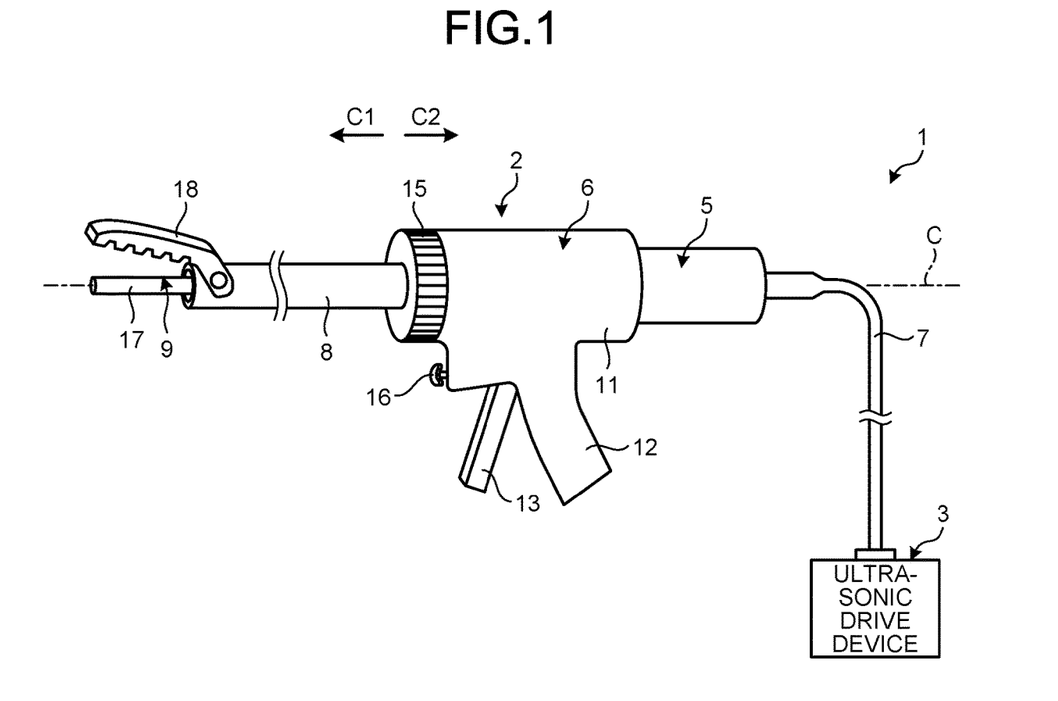
FIG. 1 is a schematic diagram illustrating a configuration of an ultrasonic drive device according to a first embodiment.

A first embodiment of the disclosure will be described with reference to FIGS. 1 to 4. FIG. 1 is a schematic diagram illustrating a configuration of an ultrasonic drive device according to the first embodiment. As illustrated in FIG. 1, an ultrasonic treatment system 1 includes an ultrasonic treatment instrument (handpiece) 2, a control unit (ultrasonic drive device) 3, and a transducer unit 5.

The ultrasonic treatment instrument 2 has a longitudinal axis C. One of the directions along the longitudinal axis C is a leading end direction (the direction of an arrow C1 in FIG. 1), and the direction opposite to the leading end direction is a base end direction (the direction of an arrow C2 in FIG. 1). The ultrasonic treatment instrument 2 includes a handle unit 6.

The handle unit 6 includes a tubular case portion 11 extended along the longitudinal axis C, a fixed handle 12 formed integrally with the tubular case portion 11, and a movable handle 13 rotatably attached to the tubular case portion 11. The fixed handle 12 is extended in a direction away from the tubular case portion 11 relative to the longitudinal axis C. The movable handle 13 performs an opening operation or a closing operation with respect to the fixed handle 12 by rotating the movable handle 13 about the attachment position to the tubular case portion 11. The handle unit 6 includes a rotary operation knob 15 attached to the leading end direction side of the tubular case portion 11. The rotary operation knob 15 is rotatable about the longitudinal axis C with respect to the tubular case portion 11. The fixed handle 12 is provided with an operation input button 16 for receiving an input of an operation for starting driving of the ultrasonic transducer.

The ultrasonic treatment instrument 2 includes a sheath 8 extended along the longitudinal axis C. The sheath 8 is inserted into the rotary operation knob 15 and the tubular case portion 11 from the leading end direction side, and the sheath 8 is thereby attached to the handle unit 6.

The ultrasonic treatment instrument 2 includes an ultrasonic probe 9. The ultrasonic probe 9 is extended along the longitudinal axis C from the inside of the tubular case portion 11 through the inside of the sheath 8. The ultrasonic probe 9 is inserted through the sheath 8. The leading end portion of the ultrasonic probe 9 is provided with a treatment portion 17 that protrudes from the leading end of the sheath 8 toward the leading end direction of the ultrasonic probe.

At the leading end portion of the sheath 8, a jaw 18 is rotatably attached. The movable handle 13 is connected to a movable tubular portion disposed in a portion on an inner circumferential direction side of the sheath 8 inside the tubular case portion 11. The leading end of the movable tubular portion is connected to the jaw 18. When the movable handle 13 performs an opening operation or a closing operation with respect to the fixed handle 12, the movable tubular portion is moved along the longitudinal axis C. Thus, the jaw 18 is rotated about the attachment position to the sheath 8. When the jaw 18 is rotated with respect to the sheath 8, the jaw 18 performs an opening operation or a closing operation with respect to the treatment portion 17. The sheath 8, the ultrasonic probe 9, and the jaw 18 are rotatable about the longitudinal axis C with respect to the tubular case portion 11 integrally with the rotary operation knob 15.

Figure 2:
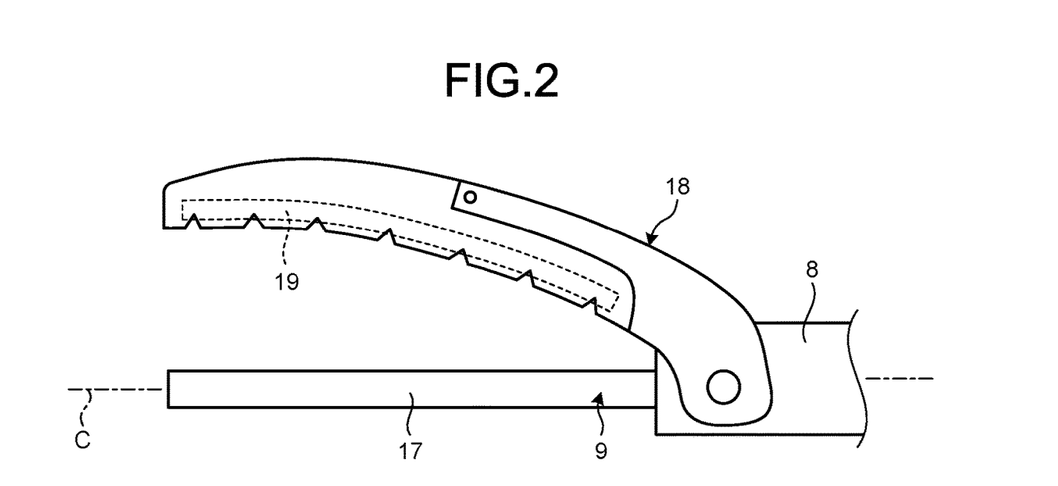
FIG. 2 is a diagram illustrating a configuration of a treatment portion and a jaw illustrated in FIG. 1.

FIG. 2 is a diagram illustrating a configuration of the treatment portion and the jaw illustrated in FIG. 1. As illustrated in FIG. 2, the jaw 18 includes an internally mounted pad 19. In a state in which the jaw 18 is closed, the pad 19 is in contact with the treatment portion 17. The jaw 18 is formed of, for example, a conductive metal. The pad 19 is formed of, for example, polytetrafluoroethylene (PTFE) having electrical insulating properties.

Returning to FIG. 1, the transducer unit 5 is detachably coupled to the base end direction side of the handle unit 6. The base end portion of the transducer unit 5 is connected to one end of a cable 7. The other end of the cable 7 is connected to the control unit 3.

Figure 3:
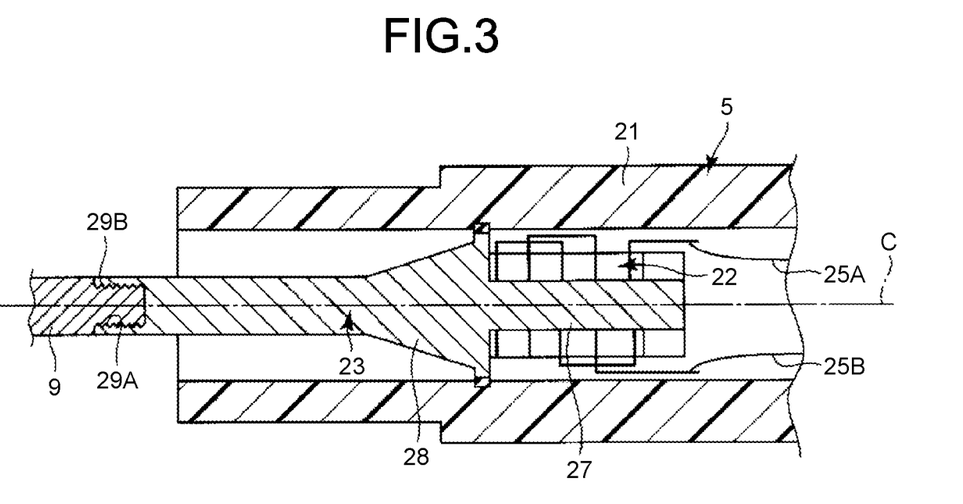
FIG. 3 is a cross-sectional view schematically illustrating a configuration of a transducer unit illustrated in FIG. 1.

FIG. 3 is a cross-sectional view schematically illustrating the configuration of the transducer unit illustrated in FIG. 1. As illustrated in FIG. 3, the transducer unit 5 includes a transducer case 21, an ultrasonic transducer 22 provided inside the transducer case 21, and a horn member 23 attached to the ultrasonic transducer 22.

The transducer unit 5 is attached to the handle unit 6 (the ultrasonic treatment instrument 2) by inserting the transducer case 21 into the tubular case portion 11 from the base end direction side. Inside the tubular case portion 11, the transducer case 21 is coupled to the sheath 8. The transducer case 21 is rotatable about the longitudinal axis C with respect to the tubular case portion 11 integrally with the rotary operation knob 15.

The ultrasonic transducer 22 is connected to electric wiring portions 25A and 25B to which electric power from the control unit 3 is inputted.

The horn member 23 is provided with a transducer mounting portion 27 on which the ultrasonic transducer 22 is mounted. The ultrasonic oscillation generated by the ultrasonic transducer 22 is transmitted to the horn member 23. The horn member 23 is provided with a cross-sectional area changing portion 28 adjacent to the leading end direction side compared to the transducer mounting portion 27. In the cross-sectional area changing portion 28, the cross-sectional area perpendicular to the longitudinal axis C decreases toward the leading end direction. The cross-sectional area changing portion 28 enlarges amplitude of the ultrasonic oscillation. The leading end portion of the horn member 23 is provided with a female screw portion 29A. The base end portion of the ultrasonic probe 9 is provided with a male screw portion 29B. By screwing the male screw portion 29B into the female screw portion 29A, the ultrasonic probe 9 is connected to the leading end direction side of the horn member 23. The ultrasonic probe 9 is connected to the horn member 23 inside the tubular case portion 11. Thus, the ultrasonic probe 9 is coupled to the ultrasonic transducer 22 via the horn member 23.

The ultrasonic oscillation transmitted to the horn member 23 is transmitted along the longitudinal axis C from the base end direction to the leading end direction in the horn member 23 and the ultrasonic probe 9. The ultrasonic oscillation is transmitted up to the treatment portion 17 toward the leading end direction. The treatment portion 17 treats a treatment target such as a living tissue by using the transmitted ultrasonic oscillation.

Figure 4:
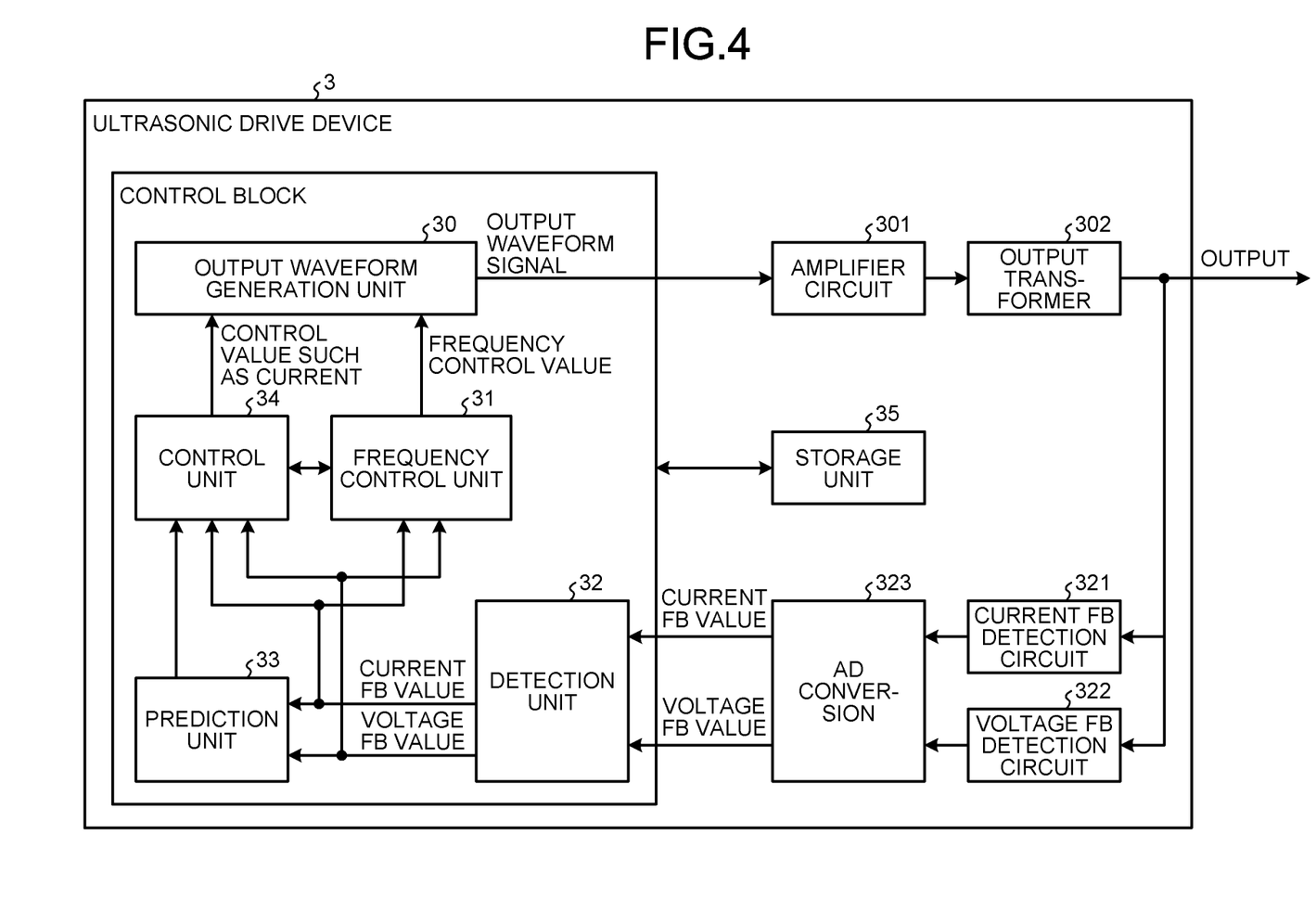
FIG. 4 is a block diagram illustrating a configuration of a control unit illustrated in FIG. 1.

Configuration of Control Unit FIG. 4 is a block diagram illustrating the configuration of the control unit illustrated in FIG. 1. As illustrated in FIG. 4, the control unit 3 includes an output waveform generation unit 30, a frequency control unit 31, a detection unit 32, a prediction unit 33, a control unit 34, and a storage unit 35.

The output waveform generation unit 30 generates and outputs an output waveform signal under the control of the control unit 34 and the frequency control unit 31. The output waveform signal outputted by the output waveform generation unit 30 is amplified by an amplifier circuit 301 and outputted to the transducer unit 5 by an output transformer 302.

The frequency control unit 31 outputs a frequency control value to the output waveform generation unit 30 under the control of the control unit 34, and resonantly drives the ultrasonic transducer 22 at a resonant frequency by PLL control. The frequency control unit 31 sweeps the frequency at which the ultrasonic transducer 22 oscillates from a predetermined frequency toward the resonant frequency.

The detection unit 32 detects a first parameter representing the driving state of the ultrasonic transducer 22. The first parameter is, for example, a current outputted to the ultrasonic transducer 22, but may be any one of a voltage outputted to the ultrasonic transducer 22, a frequency at which the ultrasonic transducer 22 oscillates, a phase difference between the current outputted to the ultrasonic transducer 22 and the voltage outputted to the ultrasonic transducer 22, a time from when driving of the ultrasonic transducer 22 is started, or a load measured by outputting a radio-frequency signal, or may be a combination thereof. Signals outputted from the transducer unit 5 are detected by a current feedback (FB) detection circuit 321 that feedback-detects a current and a voltage feedback (FB) detection circuit that feedback-detects a voltage, each converted from an analog signal to a digital signal by an AD conversion 323, and inputted to the detection unit 32 as a current feedback (FB) value and a voltage feedback (FB) value. The detection unit 32 transmits the current FB value and the voltage FB value to the frequency control unit 31, the prediction unit 33, and the control unit 34.

The prediction unit 33 predicts whether or not ringing occurs based on the first parameter. Specifically, the prediction unit 33 predicts whether or not the ringing occurs based on, for example, a rate of rise in current outputted to the ultrasonic transducer 22.

The control unit 34 outputs the control value, such as current, to the output waveform generation unit 30 and controls the signal outputted to the transducer unit 5. If a second parameter representing the frequency at which the ultrasonic transducer 22 is driven satisfies a predetermined condition, the control unit 34 controls the frequency control unit 31 to resonantly drive the ultrasonic transducer 22 at the resonant frequency by the PLL control. As for the PLL control, for example, proportional-integral-differential (PID) control can be used although not particularly limited. The second parameter is, for example, a current outputted to the ultrasonic transducer 22, but may be any one of a voltage outputted to the ultrasonic transducer 22, a frequency at which the ultrasonic transducer 22 oscillates, a phase difference between the current outputted to the ultrasonic transducer 22 and the voltage outputted to the ultrasonic transducer 22, a time from when driving of the ultrasonic transducer 22 is started, or a load measured by outputting a radio-frequency signal, or may be a combination thereof. Specifically, if the prediction unit 33 predicts that the ringing does not occur and if the current outputted to the ultrasonic transducer 22 is greater than or equal to a threshold, the control unit 34 controls the frequency control unit 31 to resonantly drive the ultrasonic transducer 22 at the resonant frequency by the PLL control.

If the prediction unit 33 predicts that the ringing occurs, the control unit 34 prevents the ringing from occurring by adjusting a third parameter for controlling the driving of the ultrasonic transducer 22. If the current outputted to the ultrasonic transducer 22 is greater than or equal to the threshold, the control unit 34 then controls the frequency control unit 31 to resonantly drive the ultrasonic transducer 22 at the resonant frequency by the PLL control.

The third parameter is, for example, a current outputted to the ultrasonic transducer 22, but may be any one of a voltage outputted to the ultrasonic transducer 22, a frequency at which the ultrasonic transducer 22 oscillates, a phase difference between the current outputted to the ultrasonic transducer 22 and the voltage outputted to the ultrasonic transducer 22, a time from when driving of the ultrasonic transducer 22 is started, a proportional gain, an integral gain, or a differential gain in the PID control, or a rate at which the frequency at which the ultrasonic transducer 22 oscillates is swept, or may be a combination thereof.

The control block including the output waveform generation unit 30, the frequency control unit 31, the detection unit 32, the prediction unit 33, and the control unit 34 is constituted by, for example, a logic circuit such as a field programmable gate array (FPGA), but may be constituted by a processor including a central processing unit (CPU), an application specific integrated circuit (ASIC), or others. At least a portion of the output waveform generation unit 30, the frequency control unit 31, the detection unit 32, the prediction unit 33, and the control unit 34 may be constituted by an independent logic circuit, such as an FPGA, or a processor including a CPU, an ASIC, or others.

The storage unit 35 records various data related to the control unit 3. The storage unit 35 stores various programs that are executed by the control unit 3. The storage unit 35 is implemented by using a random access memory (RAM), a read only memory (ROM), a hard disk drive (HDD), a solid state drive (SSD), and others.

Operation of Control Unit

The operation of the control unit 3 will now be described. First, when a treatment is performed on a treatment target such as a living tissue, using the ultrasonic treatment system 1, the movable handle 13 is closed with respect to the fixed handle 12 to grasp the treatment target between the treatment portion 17 and the jaw 18 and the pad 19 before the ultrasonic transducer 22 is driven. The control unit 3 then drives the ultrasonic transducer 22.

Figure 5:
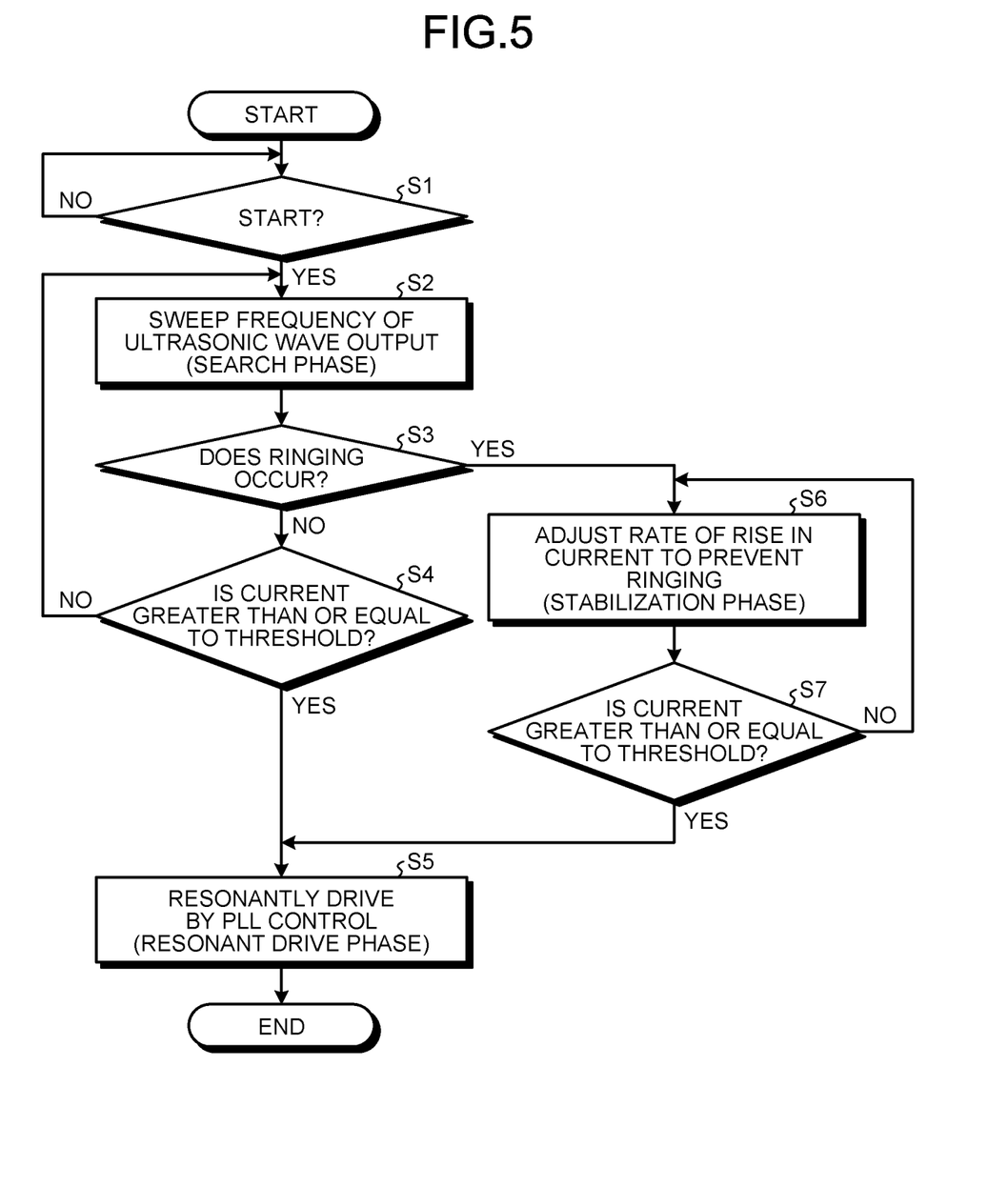
FIG. 5 is a flowchart illustrating an overview of a process in the control unit.

FIG. 5 is a flowchart illustrating an overview of a process in the control unit. As illustrated in FIG. 5, the control unit 34 detects whether or not a predetermined signal is inputted by an operation of the operation input button 16, and determines whether or not to start transmission of a drive signal for driving the ultrasonic transducer 22 (Step S1).

If the control unit 34 determines not to start the transmission of the drive signal for driving the ultrasonic transducer 22 (Step S1: No), the control unit enters a standby state in which the process of Step S1 is repeated.

On the other hand, if the control unit 34 determines to start transmission of the drive signal for driving the ultrasonic transducer 22 (Step S1: Yes), the frequency control unit 31 sweeps the frequency at which the ultrasonic transducer 22 oscillates from a predetermined frequency toward the resonant frequency (Step S2: search phase). Specifically, the frequency control unit 31 sweeps the frequency at which the ultrasonic transducer 22 oscillates from a predetermined frequency that is higher or lower than the resonant frequency by a predetermined value toward the resonant frequency, and searches for the resonant frequency. In the search phase, the control unit 34 gradually increases the current outputted to the ultrasonic transducer 22.

Figure 6:
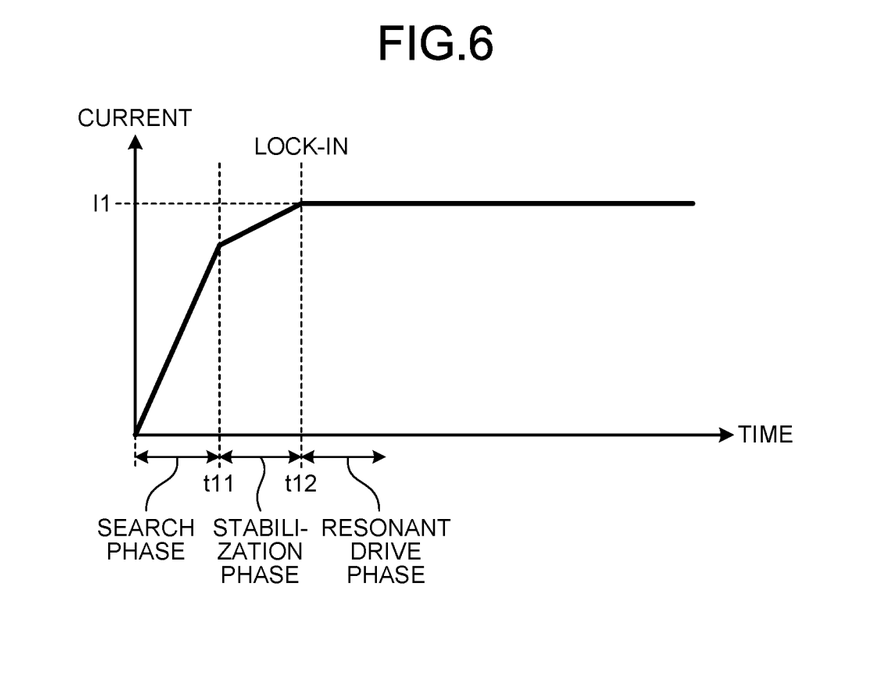
FIG. 6 is a diagram illustrating a time variation in current outputted to an ultrasonic transducer.

FIG. 6 is a diagram illustrating a time variation in current outputted to the ultrasonic transducer. In FIG. 6, the horizontal axis represents time, the vertical axis represents the current outputted to the ultrasonic transducer 22, and an ideal time variation in the current when the control unit 3 prevents the ringing from occurring is illustrated. As illustrated in FIG. 6, in the search phase during a time t=0 to t11, the control unit 34 gradually increases the current outputted to the ultrasonic transducer 22.

Figure 7:
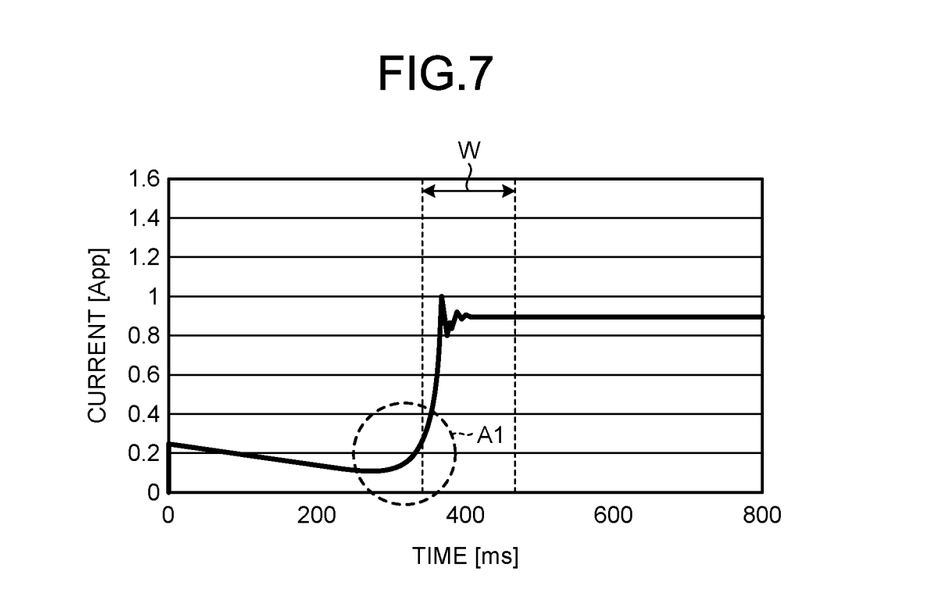
FIG. 7 is a diagram illustrating an example of a time variation in current in the case that ringing does not occur.
Figure 8:
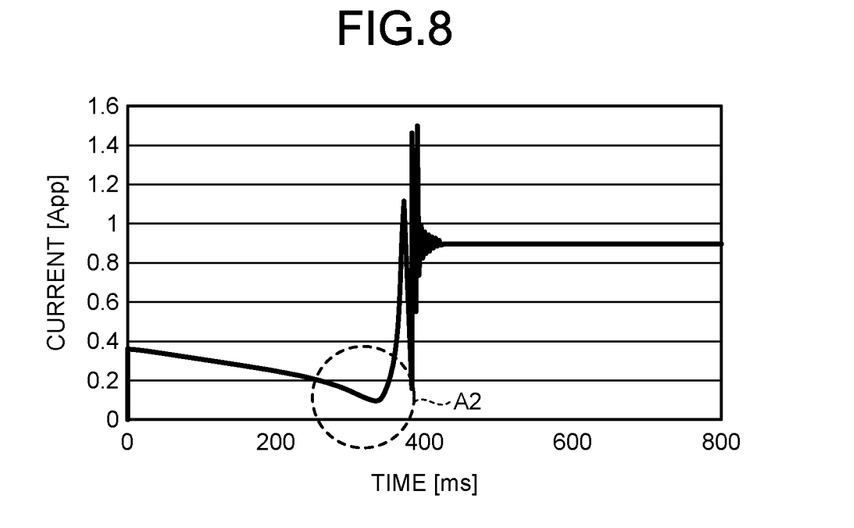
FIG. 8 is a diagram illustrating an example of a time variation in current in the case that the ringing occurs.

In the search phase, the prediction unit 33 predicts whether or not the ringing occurs based on a rate of rise in current outputted to the ultrasonic transducer 22 (Step S3). FIG. 7 is a diagram illustrating an example of a time variation in current in the case that the ringing does not occur. FIG. 8 is a diagram illustrating an example of a time variation in current in the case that the ringing occurs. In each of FIGS. 7 and 8, the horizontal axis represents time [ms], the vertical axis represents the current outputted by the control unit 3 to the ultrasonic transducer 22, and an example of measuring the time variation in current in the case that the ringing is not prevented from occurring is illustrated. A time width W illustrated in FIG. 7 corresponds to a time width illustrated in FIG. 6. Note that the currents in FIGS. 7 and 8 are values standardized by a maximum value when the ringing illustrated in FIG. 7 does not occur. As illustrated in FIGS. 7 and 8, the current decreases with the time immediately before lock-in, and then the current rapidly increases. If the rate of rise in current is low after the current is turned into an increased as in an area A1 indicated by a broken line in FIG. 7, the prediction unit 33 predicts that the ringing does not occur. On the other hand, if the rate of rise in current is high after the current is turned into an increased as in an area A2 indicated by a broken line in FIG. 8, the prediction unit 33 predicts that the ringing occurs.

In the search phase, if the prediction unit 33 predicts that the ringing does not occur (Step S3: No), the control unit 34 determines whether or not the current outputted to the ultrasonic transducer 22 is greater than or equal to a threshold (Step S4).

If the control unit 34 determines that the current outputted to the ultrasonic transducer 22 is greater than or equal to the threshold (Step S4: Yes), the control unit 34 resonantly drives the ultrasonic transducer 22 at the resonant frequency by the PLL control (Step S5: resonant drive phase). Specifically, the control unit 34 gradually increases the current outputted to the ultrasonic transducer 22 in the search phase and resonantly drive the ultrasonic transducer 22 at the resonant frequency by the PLL control if the current is greater than or equal to the threshold I1 (see FIG. 6). In other words, if the prediction unit 33 predicts that the ringing does not occur and if the current outputted to the ultrasonic transducer 22 is greater than or equal to the threshold I1, the phase is directly shifted from the search phase to the resonant drive phase. The control unit 34 then ends the series of processes, after continuing the resonant drive for a predetermined period, for example.

If the control unit 34 determines that the current outputted to the ultrasonic transducer 22 is lower than the threshold (Step S4: No), the process returns to Step S2, and the search phase is continued.

On the other hand, if the prediction unit 33 predicts that the ringing occurs (Step S3: Yes), the control unit 34 prevents the ringing from occurring by reducing the rate of rise in current outputted to the ultrasonic transducer 22 (Step S6: stabilization phase). Specifically, as illustrated in FIG. 6, in the stabilization phase during a time t=t11 to t12, the control unit 34 reduces the rate of rise in current outputted to the ultrasonic transducer 22 compared to the search phase.

The control unit 34 then determines whether or not the current outputted to the ultrasonic transducer 22 is greater than or equal to the threshold (Step S7).

If the control unit 34 determines that the current outputted to the ultrasonic transducer 22 is greater than or equal to the threshold (Step S7: Yes), the control unit 34 resonantly drives the ultrasonic transducer 22 at the resonant frequency by the PLL control (Step S5: resonant drive phase). Specifically, the control unit 34 gradually increases the current outputted to the ultrasonic transducer 22 in the stabilization phase and resonantly drive the ultrasonic transducer 22 at the resonant frequency by the PLL control if the current is greater than or equal to the threshold I1 (see FIG. 6). In other words, if the prediction unit 33 predicts that the ringing occurs, the phase is shifted from the search phase to the stabilization phase and from the stabilization phase to the resonant drive phase. The control unit 34 then ends the series of processes, after continuing the resonant drive for a predetermined period, for example.

If the control unit 34 determines that the current outputted to the ultrasonic transducer 22 is lower than the threshold (Step S7: No), the process returns to Step S6, and the stabilization phase is continued.

According to the first embodiment described above, if the prediction unit 33 predicts that the ringing does not occur and if the current reaches the threshold, the phase is shifted from the search phase to the resonant drive phase, and thus the ultrasonic transducer 22 can be resonantly driven stably. If the prediction unit 33 predicts that the ringing occurs, the control unit 34 prevents the ringing from occurring by adjusting the third parameter, and thus the ultrasonic transducer 22 can be resonantly driven stably.

Note that the first embodiment describes an example of being shifted to the stabilization phase if the prediction unit 33 predicts that the ringing occurs, but the stabilization phase may also be provided even if the prediction unit 33 predicts that the ringing does not occur. Specifically, if the second parameter satisfies a predetermined condition (e.g., if the current outputted to the ultrasonic transducer 22 is greater than or equal to a threshold lower than the threshold I1), the control unit 34 may shift from the search phase to the stabilization phase and reduce the rate of rise in current outputted to the ultrasonic transducer 22.

Modification

Although the first embodiment describes an example in which the prediction unit 33 adjusts the third parameter immediately after predicting that the ringing occurs to prevent the ringing from occurring, the example is not limited thereto. The control unit 34 may prevent the frequency at which the ultrasonic transducer oscillates from falling outside the resonant frequency by adjusting the third parameter while the ringing occurs.

Figure 9:
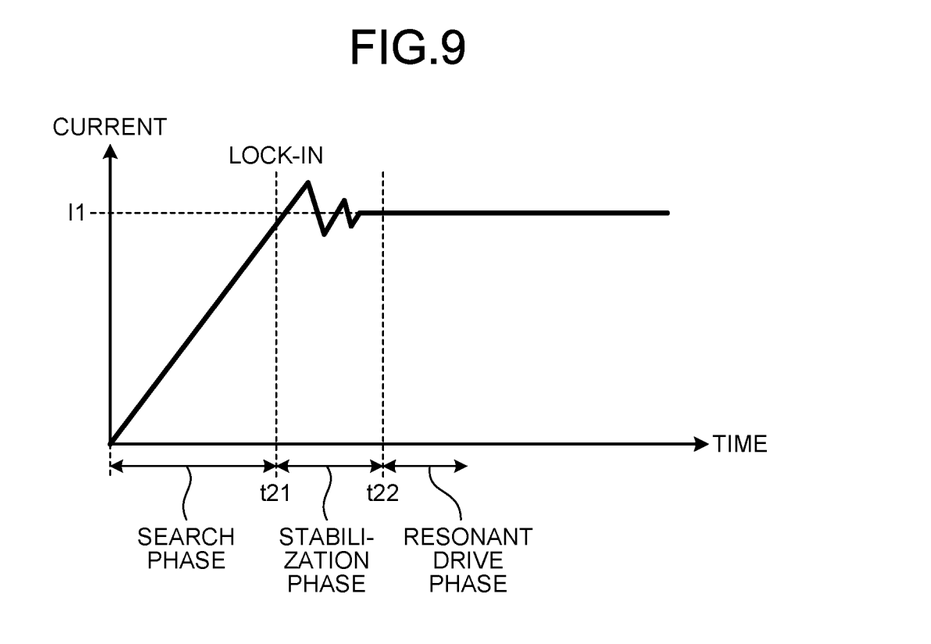
FIG. 9 is a diagram illustrating a time variation in current outputted to the ultrasonic transducer.

FIG. 9 is a diagram illustrating a time variation in current outputted to the ultrasonic transducer. In FIG. 9, the horizontal axis represents time, the vertical axis represents the current outputted to the ultrasonic transducer 22, and an ideal time variation in the current when the control unit 3 prevents the frequency at which the ultrasonic transducer 22 oscillates from falling outside the resonant frequency is illustrated. As illustrated in FIG. 9, the control unit 34 prevents the frequency at which the ultrasonic transducer 22 oscillates from falling outside the resonant frequency by adjusting the third parameter immediately after the PLL control is started (time t=t21) (stabilization phase). If the amount of variation in current detected by the detection unit 32 is less than or equal to the threshold (time t=t22), the control unit 34 ends adjustment of the third parameter and shifts from the stabilization phase to the resonant drive phase.

Second Embodiment

Although the first embodiment does not limit whether the frequency control unit 31 sweeps the frequency at which the ultrasonic transducer 22 oscillates from a frequency higher than the resonant frequency toward the resonant frequency or from a frequency lower than the resonant frequency toward the resonant frequency, either may be selected. In a second embodiment, the configuration of the ultrasonic treatment system 1 illustrated in FIGS. 1 to 3 may be the same as that in the first embodiment, and thus the description thereof will be omitted.

The detection unit 32 detects a phase difference between a current outputted to the ultrasonic transducer 22 and a voltage outputted to the ultrasonic transducer 22.

The frequency control unit 31 selects whether to sweep the frequency at which the ultrasonic transducer 22 oscillates from a frequency higher than the resonant frequency toward the resonant frequency or from a frequency lower than the resonant frequency toward the resonant frequency in response to the phase difference.

Figure 10:
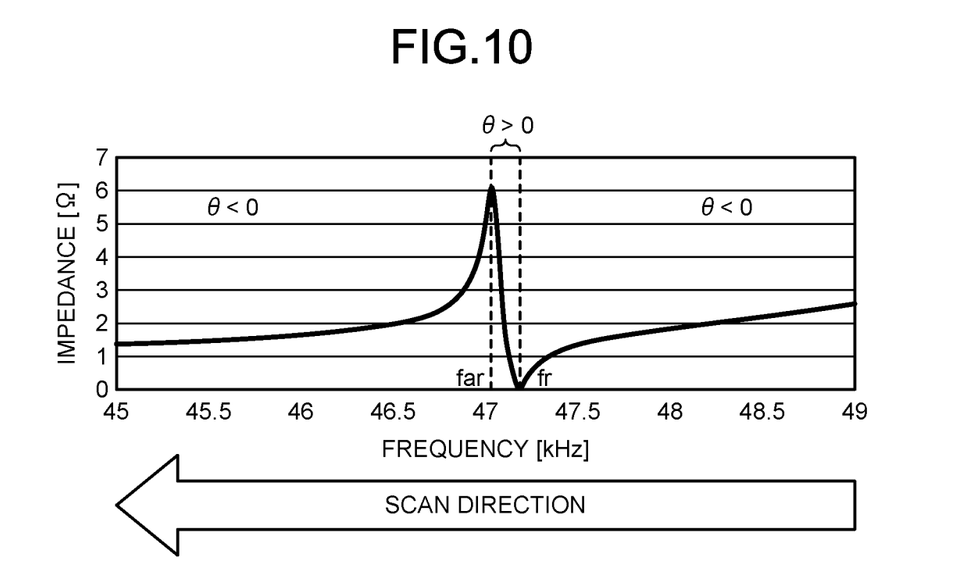
FIG. 10 is a diagram illustrating a relationship between frequency and impedance.
Figure 11:
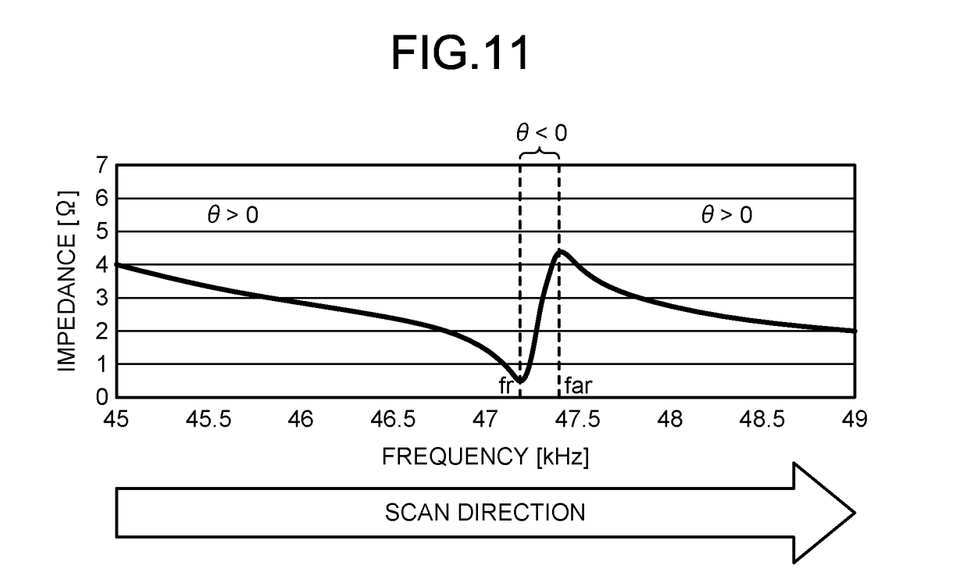
FIG. 11 is a diagram illustrating a relationship between frequency and impedance.

FIGS. 10 and 11 are diagrams illustrating a relationship between frequency and impedance. In FIGS. 10 and 11, the horizontal axis represents frequency [kHz], and the vertical axis represents impedance [Ω]. FIG. 10 illustrates a case where parasitic capacitance or parasitic inductance is low, and in this case, an anti-resonant frequency far is lower than a resonant frequency fr. A phase difference θ between the current outputted to the ultrasonic transducer 22 and the voltage outputted to the ultrasonic transducer 22 is larger than zero between the resonant frequency fr and the anti-resonant frequency far, and is smaller than zero at a frequency higher than the resonant frequency fr and at a frequency lower than the anti-resonant frequency far. On the other hand, FIG. 11 illustrates a case where the parasitic capacitance or the parasitic inductance is high, and in this case, the anti-resonant frequency far is higher than the resonant frequency fr. The phase difference θ between the current outputted to the ultrasonic transducer 22 and the voltage outputted to the ultrasonic transducer 22 is larger than zero at a frequency higher than the resonant frequency fr and at a frequency lower than the anti-resonant frequency far, and is smaller than zero between the resonant frequency fr and the anti-resonant frequency far.

When the frequency control unit 31 sweeps the frequency, the impedance rapidly changes at a frequency between a resonance point and an anti-resonance point, and thus the phase difference is likely to fall outside the control scope of the PLL control. Therefore, if the frequency is higher or lower than the resonant frequency fr by a predetermined value, the detection unit 32 detects whether the phase difference θ is larger than zero or smaller than zero.

In the state illustrated in FIG. 10 in which the phase difference θ is smaller than zero, the frequency control unit 31 sweeps the frequency at which the ultrasonic transducer 22 oscillates from a high frequency side toward the resonant frequency. As a result, the sweep of the frequency does not pass between the resonance point and the anti-resonance point and can thus prevent the phase difference θ from falling outside the control scope of the PLL control.

In the state illustrated in FIG. 11 in which the phase difference θ is larger than zero, the frequency control unit 31 sweeps the frequency at which the ultrasonic transducer 22 oscillates from a low frequency side toward the resonant frequency. As a result, the sweep of the frequency does not pass between the resonance point and the anti-resonance point and can thus prevent the phase difference θ from falling outside the control scope of the PLL control.

Third Embodiment

In addition to the output of ultrasonic waves, the ultrasonic treatment system 1 according to a third embodiment can output a radio-frequency current to a treatment target grasped between the treatment portion 17 and the jaw 18 and the pad 19. In the third embodiment, the configuration of the ultrasonic treatment system 1 illustrated in FIGS. 1 to 3 may be the same as that in the first embodiment, and thus the description thereof will be omitted.

Figure 12:
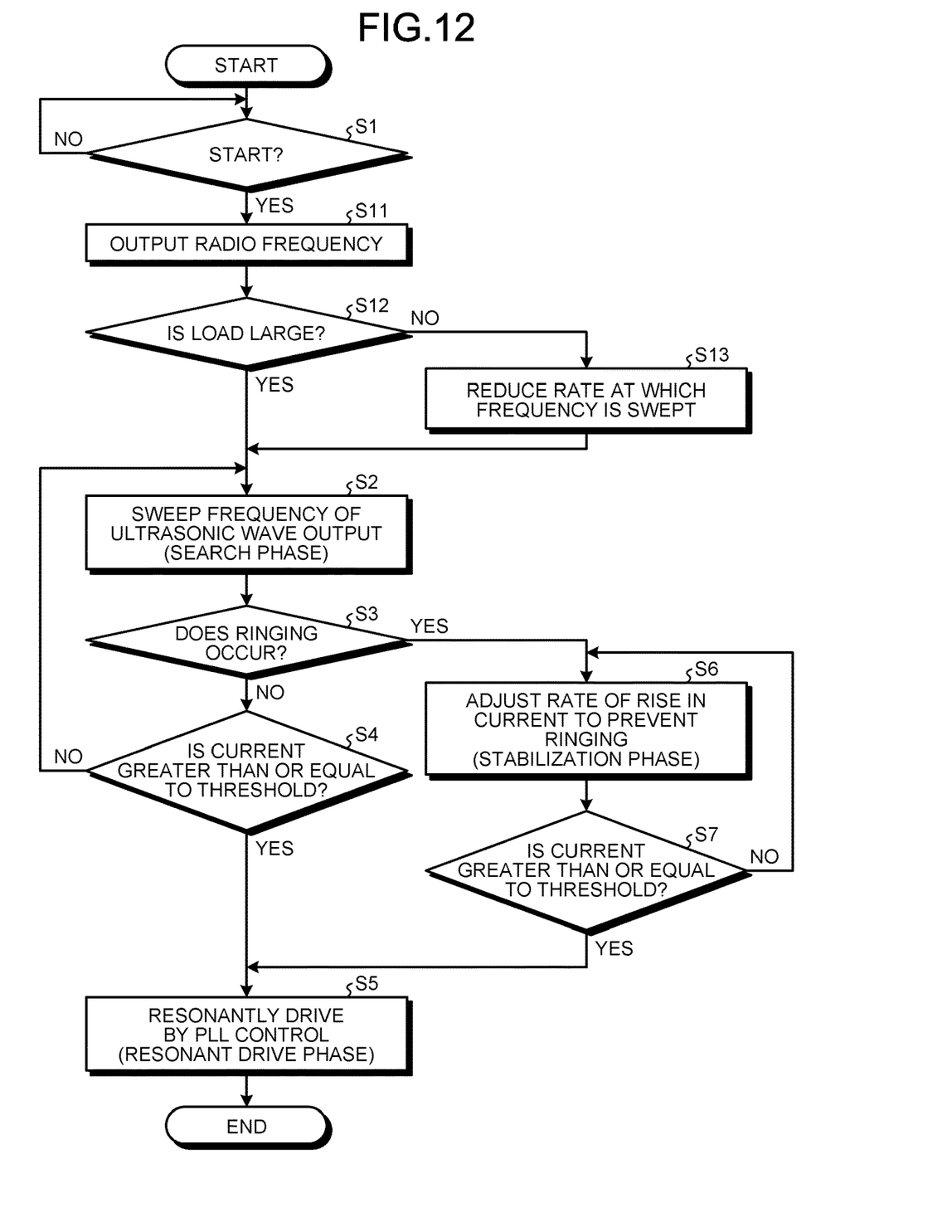
FIG. 12 is a flowchart illustrating an overview of a process in the control unit.

FIG. 12 is a flowchart illustrating an overview of a process in the control unit. As illustrated in FIG. 12, in Step S1, if the control unit 34 determines to start transmission of a drive signal for driving the ultrasonic transducer 22 (Step S1: Yes), the control unit 34 outputs a radio-frequency current between the treatment portion 17 and the pad 19 (Step S11).

The detection unit 32 then detects the treatment target grasped between the treatment portion 17 and the pad 19 as a load, and the control unit 34 determines whether or not the load detected by the detection unit 32 is greater than or equal to a threshold (Step S12).

If the control unit 34 determines that the load detected by the detection unit 32 is greater than or equal to the threshold (Step S12: Yes), the process proceeds to Step S12.

On the other hand, if the control unit 34 determines that the load detected by the detection unit 32 is smaller than the threshold (Step S12: No), the frequency control unit 31 reduces a rate at which the frequency is swept in the search phase (Step S13). In the search phase, the control unit 34 reduces a rate at which the current outputted to the ultrasonic transducer 22 is increased. In the case that the treatment target grasped between the treatment portion 17 and the pad 19 is thin and the load is small, the current easily flows, and thus the current is likely to change rapidly. Therefore, in the case that the load is small, the rate at which the frequency is swept or the rate of rise in current is reduced to prevent the ringing from occurring. Note that, in the case that the load is small, not only in the search phase but also in the stabilization phase, the rate at which the frequency is swept or the rate of rise in current may be reduced.

Other Examples

Figure 13:
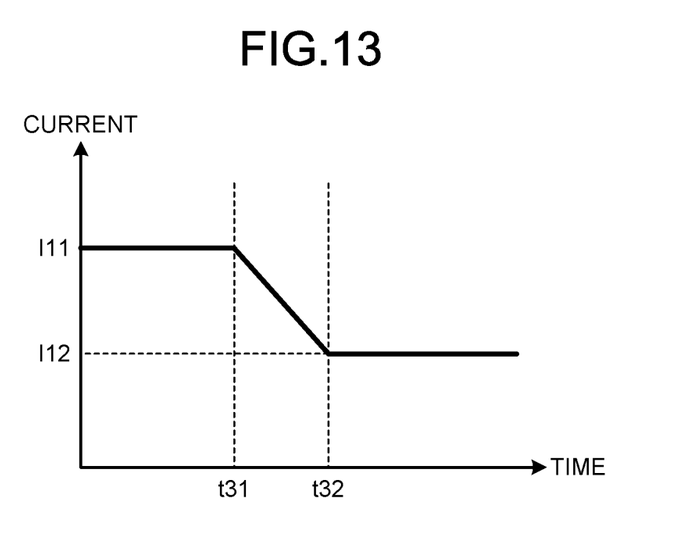
FIG. 13 is a diagram illustrating a relationship between the time after the resonant drive of the ultrasonic transducer is ended and the current outputted to the ultrasonic transducer.

FIG. 13 is a diagram illustrating a relationship between the time after the resonant drive of the ultrasonic transducer is ended and the current outputted to the ultrasonic transducer. In FIG. 13, the horizontal axis represents time, and the vertical axis represents the current outputted to the ultrasonic transducer 22. As illustrated in FIG. 13, at a time t=t31 when a predetermined time elapses after the control unit 3 resonantly drives the ultrasonic transducer 22, the control unit 3 reduces the current outputted to the ultrasonic transducer 22. Specifically, the control unit 3 reduces the current outputted to the ultrasonic transducer 22 from I11 to I12 during a time t=t31 to t32. As a result, the pad 19 can be prevented from being damaged by the output of ultrasonic waves between the treatment portion 17 and the pad 19 after the treatment of the treatment target is ended.

The disclosure can achieve a method of actuating an ultrasonic drive device, an ultrasonic drive device, and an ultrasonic treatment system capable of resonantly driving an ultrasonic transducer stably.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasonic drive device comprising:
a first control circuit configured to sweep a frequency at which an ultrasonic transducer oscillates from a predetermined frequency toward a resonant frequency;
a prediction circuit configured to predict whether or not ringing occurs based on a first parameter representing a driving state of the ultrasonic transducer; and
a second control circuit configured to, when the prediction circuit predicts that ringing does not occur and if a second parameter representing a frequency at which the ultrasonic transducer is driven satisfies a predetermined condition, resonantly drive the ultrasonic transducer at a resonant frequency by phase locked loop (PLL) control, wherein:
when the prediction circuit predicts that the ringing occurs, the second control circuit adjusts a third parameter for controlling driving of the ultrasonic transducer to prevent the ringing from occurring, and wherein when the second parameter satisfies a predetermined condition, the second control circuit resonantly drives the ultrasonic transducer at a resonant frequency by PLL control;
the predetermined condition is a set value that triggers a resonant drive phase during which the ultrasonic transducer is resonantly driven at the resonant frequency; and
satisfying the predetermined condition corresponds to the second parameter being equal to or greater than the set value.

2. The ultrasonic drive device according to claim 1, wherein the ultrasonic drive device is included in an ultrasonic treatment system comprising an ultrasonic transducer configured to oscillate in response to an output of the ultrasonic drive device.

3. The ultrasonic drive device according to claim 1, wherein the second control circuit is configured to adjust a third parameter for controlling driving of the ultrasonic transducer immediately after the PLL control is started to resonantly drive the ultrasonic transducer at the resonant frequency.

4. The ultrasonic drive device according to claim 1, wherein the third parameter includes any of a current outputted to the ultrasonic transducer, a voltage outputted to the ultrasonic transducer, a frequency at which the ultrasonic transducer oscillates, a phase difference between the current outputted to the ultrasonic transducer and the voltage outputted to the ultrasonic transducer, a time from when driving of the ultrasonic transducer is started, one of a proportional gain, an integral gain, and a differential gain in proportional-integral-differential (PID) control, or a rate at which the frequency at which the ultrasonic transducer oscillates is swept.

5. The ultrasonic drive device according to claim 1, wherein the third parameter is a current outputted to the ultrasonic transducer, and wherein the second control circuit is configured to reduce a rate of rise in the current outputted to the ultrasonic transducer to resonantly drive the ultrasonic transducer at the resonant frequency.

6. The ultrasonic drive device according to claim 1, wherein the first parameter and the second parameter include any of a current outputted to the ultrasonic transducer, a voltage outputted to the ultrasonic transducer, a frequency at which the ultrasonic transducer oscillates, a phase difference between the current outputted to the ultrasonic transducer and the voltage outputted to the ultrasonic transducer, a time from when driving of the ultrasonic transducer is started, or a load measured by outputting a radio-frequency signal.

7. The ultrasonic drive device according to claim 1, wherein the first parameter is a current outputted to the ultrasonic transducer, and wherein the prediction circuit is configured to predict whether or not the ringing occurs based on a rate of rise in the current outputted to the ultrasonic transducer.

8. The ultrasonic drive device according to claim 1, wherein the second parameter is a current outputted to the ultrasonic transducer, and wherein when the current outputted to the ultrasonic transducer is greater than or equal to a threshold, the second control circuit is configured to resonantly drive the ultrasonic transducer at the resonant frequency by the PLL control.

9. The ultrasonic drive device according to claim 1, wherein the first control circuit is configured to select whether to sweep the frequency at which the ultrasonic transducer oscillates from a frequency higher than the resonant frequency or from a frequency lower than the resonant frequency in response to a phase difference between a current outputted to the ultrasonic transducer and a voltage outputted to the ultrasonic transducer.

10. A method of actuating an ultrasonic drive device, the method comprising:
sweeping, by a first control circuit, a frequency at which an ultrasonic transducer oscillates from a predetermined frequency toward a resonant frequency;
predicting, by a prediction circuit, whether or not ringing occurs based on a first parameter representing a driving state of the ultrasonic transducer; and
responsive to the prediction circuit predicting that ringing does not occur and when a second parameter representing a frequency at which the ultrasonic transducer is driven satisfies a predetermined condition, resonantly driving, by a second control circuit, the ultrasonic transducer at a resonant frequency by phase locked loop (PLL) control, wherein:
when the prediction circuit predicts that the ringing occurs, the second control circuit adjusts a third parameter for controlling driving of the ultrasonic transducer to prevent the ringing from occurring, and wherein when the second parameter satisfies a predetermined condition, the second control circuit resonantly drives the ultrasonic transducer at a resonant frequency by PLL control:
the predetermined condition is a set value that triggers a resonant drive phase during which the ultrasonic transducer is resonantly driven at the resonant frequency; and
satisfying the predetermined condition corresponds to the second parameter being equal to or greater than the set value.

11. The method of actuating the ultrasonic drive device according to claim 10, further comprising:
when the prediction circuit predicts that the ringing occurs, adjusting, by the second control circuit, a third parameter for controlling driving of the ultrasonic transducer to prevent the ringing from occurring, and when the second parameter satisfies a predetermined condition, resonantly driving, by the second control circuit, the ultrasonic transducer at a resonant frequency by PLL control.

12. The method of actuating the ultrasonic drive device according to claim 10, wherein the ultrasonic transducer is resonantly driven at the resonant frequency by adjusting a third parameter for controlling driving of the ultrasonic transducer by the second control circuit immediately after the PLL control is started.

13. The method of actuating the ultrasonic drive device according to claim 11, wherein the third parameter includes any of: i) a current outputted to the ultrasonic transducer, ii) a voltage outputted to the ultrasonic transducer, iii) a frequency at which the ultrasonic transducer oscillates, iv) a phase difference between the current outputted to the ultrasonic transducer and the voltage outputted to the ultrasonic transducer, v) a time from when driving of the ultrasonic transducer is started, vi) one of a proportional gain, an integral gain, or a differential gain in proportional-integral-differential (PID) control, or vii) a rate at which the frequency at which the ultrasonic transducer oscillates is swept.

14. The method of actuating the ultrasonic drive device according to claim 11, wherein the third parameter is a current outputted to the ultrasonic transducer, and wherein the ultrasonic transducer is resonantly driven at the resonant frequency by reducing a rate of rise in the current outputted to the ultrasonic transducer by the second control circuit.

15. The method of actuating the ultrasonic drive device according to claim 10, wherein the first parameter and the second parameter include any of: i) a current outputted to the ultrasonic transducer, ii) a voltage outputted to the ultrasonic transducer, iii) a frequency at which the ultrasonic transducer oscillates, iv) a phase difference between the current outputted to the ultrasonic transducer and the voltage outputted to the ultrasonic transducer, v) a time from when driving of the ultrasonic transducer is started, or vi) a load measured by outputting a radio-frequency signal.

16. The method of actuating the ultrasonic drive device according to claim 10, wherein the first parameter is a current outputted to the ultrasonic transducer, and wherein the predicting includes predicting, by the prediction circuit, whether or not the ringing occurs based on a rate of rise in the current outputted to the ultrasonic transducer.

17. The method of actuating the ultrasonic drive device according to claim 10, wherein the second parameter is a current outputted to the ultrasonic transducer, and wherein when the current outputted to the ultrasonic transducer is greater than or equal to a threshold, the ultrasonic transducer is resonantly driven at the resonant frequency by the PLL control by the second control circuit.

18. The method of actuating the ultrasonic drive device according to claim 10, wherein the sweeping includes selecting, by the first control circuit, whether to sweep the frequency at which the ultrasonic transducer oscillates from a frequency higher than the resonant frequency or from a frequency lower than the resonant frequency in response to a phase difference between a current outputted to the ultrasonic transducer and a voltage outputted to the ultrasonic transducer.

* * * * *